United States Patent Office 2,740,115
Patented Mar. 27, 1956

2,740,115

METHODS OF PRODUCING TRIPLE SUPERPHOSPHATE

Leroy Henry Facer, Phelps, N. Y., assignor, by mesne assignments, to Glen E. Cooley, Schenectady, N. Y., Warren Dunham Foster, Ridgewood, N. J., Halfdan Gregersen, New York, N. Y., Magnus I. Gregersen, Englewood, N. J., and Dana S. Lamb, New York, N. Y., trustees No Drawing. Original application July 9, 1942, Serial No. 450,324. Divided and this application April 19, 1951, Serial No. 221,931

17 Claims. (Cl. 71—41)

As is well known to the practitioners of the fertilizer art, the three major products of importance in any complete or mixed fertilizer are nitrogen (N), phosphorus ($P_2O_5$), and potash ($K_2O$). The material most widely used as a source of phosphates, either in a mixed fertilizer or alone, is superphosphate. Superphosphate generally is made by treating ground phosphate rock with sulphuric or other strong mineral acid in order to convert the phosphate in the rock, which is in a form in which it cannot be used by the plant, to a form in which it can be so used.

In my co-pending parent application, Serial Number 450,324, filed July 9, 1942, of which this application is a division, I describe and claim other processes all depending upon processing a phosphatic or related component or one containing a metallic (minor) element either by a direct use of materials which conventionally are either wasted or must be expensively reprocessed for effective use, or by the use of such materials in a manner to produce at one operation both a major product and a minor but important by-product. As in my parent application this invention is particularly concerned with the maximum utilization of a strong mineral acid or acids in a manner which saves time, cost and materials. By the use of the principles of this invention, I avoid processes which are expensive in capital, materials, labor and other operating costs and secure a better product, physically and chemically.

As is well known in the fertilizer industry, so-called triple superphosphate, which is a much concentrated product containing from 45% to 48% "available phosphoric acid" considered as $P_2O_5$ of which approximately 90% is water-extractable and in the form of mono-calcium phosphate, is made by acidulating phosphate rock with phosphoric acid ($H_3PO_4$). In the fertilizer industry, the phosphatic content of a fertilizer has long been called "phosphoric acid" but in fact it is a phosphate salt or salts including more or less free acid and is stated in terms of $P_2O_5$. Except as specifically indicated, however, I herein use the term "phosphoric acid" to mean $H_3PO_4$.

To secure phosphoric acid, phosphate rock is previously acidulated with sulphuric acid to produce phosphoric acid and gypsum. The phosphoric acid is washed from the gypsum and results in a dilute $H_3PO_4$ of approximately 41% or 30° Baumé. An amount of phosphoric acid up to approximately 2% of the weight of the gypsum is left therein after the washing process has been completed. At least 5% of the phosphoric acid is lost. This dilute acid which results from this process before it can be used for making triple superphosphate must be concentrated to 60% or 70%—that is, approximately 43° to 50° Baumé. Phosphoric acid is also made by volatization by heat, but this invention is only indirectly concerned with that process.

The conventional method of producing triple superphosphate includes the acidulation of phosphate rock with phosphoric acid of no greater concentration than 50° Baumé since if a more concentrated acid is employed the mass sets so quickly that it cannot be handled. As the result of the conventional operation an extremely moist product results which is not self-drying. After a cure of several days in a large pile this mass is still wet and must be kiln dried preferably under continuous agitation. This period of cure is necessary because of the slow action of a weak acid. Its moisture is reduced to 2% or less and the dry mass which results is composed of hard lumps of various sizes which thereupon must be crushed and ground. This dry product creates a large amount of irritating dust which is so harmful to all who have to handle it in mass that respirators or gas masks must be continuously used and even so unless precautions are continuously observed much damage to health results.

According to the principles set out in my parent application by the use of phosphoric acid more concentrated than that used in the prior art I am able to make a triple superphosphate of an unusually high degree of availability and water-extractability without kiln or other artificial drying. I completely dispense with all of the expensive specialized apparatus and processes which others use in this connection and my product at no point in its development is dusty or harmful to workers. While other practitioners use excess water to keep their material from hardening to a point which prevents it from being readily disintegrated and later dry out this excess water, I use an excess of concentrated acid in a first stage thereby securing an intermediate product which can be handled and treated mechanically and then add additional phosphate rock to utilize the excess acid. Since I use concentrated acid it operates quickly without necessity for storage for curing purposes. My end product, without heating or grinding, is in the form of dry pellets from which no dust evolves.

Another basis of economy in my process is my use of rock ground no finer than that generally employed for ordinary superphosphate. For example, I find that in making these concentrated phosphatic products I can use phosphate rock ground so that 60% passes through a screen with one hundred meshes to the inch. I use all of such rock as it comes from the grinding mechanism, not separating the fine from the coarse. Rock for use in making triple superphosphate is now ordinarily ground so that from 80% to 90% passes through a hundred mesh screen. This fine grinding is an expensive operation. By this coarse grinding, I not only save expense, but also I slow down the reaction (during this mixing operation) so that the resulting acidulated mass can be handled much more readily.

In one illustration of my method of producing my triple superphosphate, I divide 813 pounds of ground phosphate rock which I am to use into two parts, for example one of 713 pounds and the other of 100 pounds. I place the larger quantity of rock in an ordinary superphosphate mixing pan or like mixer and add to it 1227 pounds of phosphoric acid of 87% (or correspondingly more if an acid of the concentration of 70% or 75% is to be substituted) and mix in the ordinary way with the application of no extra power. Ordinary (conventional) phosphoric acid may be employed or that produced in accordance with the novel method which I have described in my said parent application and described and claimed in my copending application Serial Number 221,932, filed April 19, 1951, likewise a division thereof. This is purely a mixing operation.

From the time of completing this first mixing operation forwardly I may handle the mass so produced in any one of several different ways:

1. After the mixing operation has been concluded, in from a minute to two minutes, for example, I may place the mixture in a den where I leave it for a few minutes until it hardens. This hardening places the mass in a sufficiently plastic condition to be handled as easily as ordinary superphosphate in the den. Then I disintegrate it and pass it while still hot and steaming, although not as hot as ordinary superphosphate, into a pelleting drum such as that described in my said co-pending parent application. Thereupon as the drum is revolved I add the additional hundred pounds of phosphate rock. At this time excess acid which I have used in the mixing pan has come to the surface of the particles and immediately unites with the ground rock which is added. This rock adheres to the surface and physically absorbs the acid which thereupon proceeds to react with the tri-calcium phosphate to form available $P_2O_5$, this crystallization "drying" the pellet throughout, the coating having established the identity of each pellet. The resulting pellet is of the type described and claimed per se in my co-pending application Serial Number 432,350 filed February 24, 1942.

2. Alternatively I may use a screw conveyor to move this acidulated mixture directly from the mixing pan to a pelleting drum omitting the intermediate step of permitting it to harden to a plastic state in a den. This conveying operation need not take over five minutes because by that time the mixture will have set sufficiently so that it can be handled as above; that is, I add the additional one hundred pounds of phosphate rock late in the pelleting operation and during the revolution of the drum.

3. I may empty a mixing pan into a form such as described and claimed in my Patent Number 2,061,567, dated November 24, 1936. After the mass so emptied has hardened in the block which is so formed, I may scrape the material from the top of the block in the manner described and claimed in my Patent Number 2,213,243, dated September 3, 1940, and place it in the pelleting drum as before. It will be understood that this action is a conveying and disintegrating one.

4. Again alternatively I may mix the phosphate rock and phosphoric acid as above in a special movable multi-purposed den such as shown in Figure 16 of my said application, Serial Number 432,350, filed February 25, 1942, parent to the parent hereof, and after the mixing operation has been completed remove the paddles therefrom. After a few minutes of hardening to a plastic state the paddles may be again introduced and revolved. They will gradually dig their way into the mass and disintegrate it and pellet it at the same time. After the desired degree of pelleting has been secured I add the additional one hundred pounds of ground phosphate rock.

In all of the four methods described above for handling this material, I may add other fertilizing material either to the pelleting drum in forms 1 to 3 inclusive or to the special movable den of form 4. In connection with form 4 it will be understood that I prefer to use a plurality of movable multi-purposed dens so that the entire operation while on a batch basis may be continuously carried forward.

The above ratio of about seven parts of rock to be first mixed with all of the acid to one part of rock to be added later is illustrative and not definitive. As is well known to those skilled in this art, details of treatment of each shipment and each source of phosphate rock vary in accordance with particle size and chemical analysis, including factors other than B. P. L. As is made clear throughout this specification I produce an intermediate product (after the first mixing and before pelleting), which is sufficiently plastic to be readily handled. Consequently this ratio of the one portion of rock to the other portion will be changed in order always to achieve my characteristic physical consistency. Thus the choice of this exact ratio is a matter more of physical than chemical consideration.

As stated at greater length in my said co-pending application Serial Number 450,324 parent hereto I also have found that it is often advantageous to make the above separation of the phosphate rock on the basis of the side of the particles. As before stated, the rock is ground relatively coarsely. It need not be ground finer than for 60% to pass through a hundred mesh screen. Such separation on the basis of particle size is particularly useful when one uses rocks which present particularly difficult problems of digestion. In such cases I apply the entire quantity of the acid to the coarse particles and use finer material for the later step. If the characteristics of the rock and degree of grinding used are such as to produce materially more than the 14% of fine material above noted I add all but this fraction of the fines to the coarse rock and apply to it all of the acid.

It will be understood that in the above operation no matter how carried out I over-acidulate the phosphate rock in the first stage. By adding the second quantity of ground rock, as described and claimed in other embodiments in my said co-pending applications, I absorb this excess acid and put it to effective use in converting unavailable $P_2O_5$ to an available form, this chemical action in itself drying my pellets. By the over-acidulation of relatively coarse rock in the first stage, I am able to maintain the entire mass in a sufficiently plastic form to be handled as easily as ordinary superphosphate.

Particular note should be made of the fact that at no point do I apply external heat. There is no kiln drying or other form of dehydration. By use of excess acid until the final stage of the operation, I keep the mass sufficiently plastic so that it can be readily handled. Then I add more phosphate rock so that the excess acid is utilized in the production of additional phosphatic salts and the pellets are thereby "dried" and hardened. At no time is any appreciable amount of moisture driven off. These pellets when fully cured and ready for use, however, have a moisture content of about five percent, in contrast to the usual two percent. My process avoids the dustiness which has caused so much difficulty in the making and handling of triple superphosphate.

As is known to those skilled in this art triple superphosphate as conventionally produced is high in free acid, to such an extent that it is difficult to store in bags for more than a few weeks. My triple superphosphate, however, is both low in free acid and that which does persist is encased within a pellet the exterior of which is without free acid. It will be noted that the freedom from dust both in my manufacturing operation and in the resulting product arises from the retention as water of crystallization of the moisture which others drive off by heat, thereby breaking down these crystals by dehydration into annoying and harmful dust. The curing period in a large pile necessary in the conventional operation because of the time taken for the weak acid to become effective starts this dehydration of the crystals and the later kiln drying completes it.

The following analysis (Wiley No. 156,397–146) may be taken as typical of my triple superphosphate manufactured in the above manner:

| | Per cent |
|---|---|
| Moisture at 100° C | 5.35 |
| Total phosphoric acid | 50.20 |
| Insoluble phosphoric acid | .04 |
| Available phosphoric acid | 50.16 |
| Water soluble phosphoric acid | 49.25 |

It will be noted that I secure without the application of external heat a triple superphosphate which is palpably dry. For simplicity in the sub-joined claims I state that the concentration of the acid is such that no more water is present in the finished product than that required in the acidulation reaction with all of the phosphate rock employed to produce superphosphate and to furnish substantially all of the water evaporated by the natural heat of reaction and all of the water of crystallization required by the complete hydration of the end product. It is to be understood, however, that I also seal within each pellet, the exterior surface being dry to the touch, an additional amount of moisture, the presence of which is disregarded in the claims.

It will be readily understood by those skilled in this art that my process as described and claimed herein may be advantageously applied to the manufacture of superphosphate of any desired quantity of $P_2O_5$ greater than twenty percent (within the chemical upper limits), twenty percent being the figure which can readily be reached by the acidulation of phosphate rock by sulphuric acid. For simplicity in the sub-joined claims I am using the term "triple superphosphate" to include any superphosphate containing a percentage of $P_2O_5$ greater than that which can be obtained by the directed use of sulphuric acid.

It will be understood that by the above process I secure a triple superphosphate both of a higher degree of availability than that common at present and also one which has a higher ratio in percent of its available $P_2O_5$ in water-extractable form and in addition has the peculiar crop-producing capacity which is explained at length in my said parent applications. I completely avoid the expensive process of kiln drying and the product is not dusty and harmful to health.

Although I am presenting for purposes of illustration only certain preferred embodiments of my invention it will be readily understood that changes may be made therein within the spirit of my invention and the scope of my broader claims. The advantages of this invention will be clear from the above discussion and the appended claims. These advantages include the production of triple superphosphate of unusually high availability and water-extractability after a short curing period and with low free acid, cheaply, simply, without kiln or other artificial drying and without the development of dust. Practice of my invention results in an end product which is pelleted and has the high crop-producing capacity of the parent of my said parent application.

I claim:

1. A process of manufacturing triple superphosphate in particulate form which comprises: dividing a predetermined quantity of ground phosphate rock into a selected major and a minor portion; mixing and reacting a predetermined quantity of concentrated phosphoric acid with said selected major portion of the said ground phosphate rock, the predetermined amount of concentrated phosphoric acid being the amount sufficient to react with all of the said predetermined quantity of ground phosphate rock and in excess of the amount sufficient to react with said selected major portion of said ground phosphate rock, and the concentration of the said phosphoric acid being sufficiently high to limit and control the amount of water present to that required by complete reaction of the entire predetermined quantity of ground phosphate rock and the entire predetermined quantity of phosphoric acid, and to furnish water of crystallization of the triple superphosphate produced after loss of water evaporated by the natural heat of reaction; disintegrating the mass formed by said mixing and reaction of said phosphoric acid and said selected major portion of said rock to form disintegrated small particles which are chemically active and over-acidulated; subjecting said disintegrated small particles to movement to form coalesced larger particles of desired size; and thereafter adding the said minor portion of said predetermined quantity of ground phosphate rock to coat the said coalesced larger particles, thereby reacting said minor portion of said ground rock with the said excess quantity of phosphoric acid to form coalesced particulate triple superphosphate.

2. A process of manufacturing particulate triple superphosphate which comprises: dividing a predetermined quantity of ground phosphate rock into a selected major and a minor portion; mixing and reacting a predetermined quantity of concentrated phosphoric acid with said selected major portion of said ground phosphate rock, the predetermined amount of concentrated phosphoric acid being the amount sufficient to react with all of the said predetermined quantity of ground phosphate rock and in excess of the amount sufficient to react with said selected major portion of said phosphate rock, and the concentration of the said phosphoric acid being above about 50° Baumé and sufficiently high to limit and control the amount of water present to that required by complete reaction of the entire predetermined quantity of ground phosphate rock and the entire predetermined quantity of phosphoric acid, and to furnish water of crystallization of the triple superphosphate produced after loss of water evaporated by the natural heat of reaction; disintegrating the mass formed by said mixing and reaction of said phosphoric acid and said selected major portion of said rock to form disintegrated small particles which are chemically active and over-acidulated; subjecting said disintegrated small particles to movement to form coalesced larger particles of desired size; and thereafter adding the said minor portion of said predetermined quantity of ground phosphate rock to coat the said coalesced larger particles, thereby reacting said minor portion of said ground rock with the said excess quantity of phosphoric acid to form substantially dry, coalesced particulate triple superphosphate.

3. A process of manufacturing particulate triple superphosphate which comprises: dividing a predetermined quantity of ground phosphate rock into a selected major and a minor portion; mixing and reacting a predetermined quantity of concentrated phosphoric acid with said selected major portion of the said ground phosphate rock, the predetermined amount of concentrated phosphoric acid being the amount sufficient to react with all of the said predetermined quantity of ground phosphate rock and in excess of the amount sufficient to react with said selected major portion of said phosphate rock, and the concentration of the said phosphoric acid being between about 70% and about 87% acid and sufficiently high to limit and control the amount of water present to that required by complete reaction of the entire predetermined quantity of ground phosphate rock and the entire predetermined quantity of phosphoric acid, and to furnish water of crystallization of the triple superphosphate produced after loss of water evaporated by the natural heat of reaction; disintegrating the mass formed by said mixing and reaction of said phosphoric acid and said selected major portion of said rock to form disintegrated small particles which are chemically active and over-acidulated; subjecting said disintegrated small particles to movement to form coalesced larger particles of desired size; and thereafter adding the said minor portion of said predetermined quantity of ground phosphate rock to coat the said coalesced larger particles, thereby reacting said minor portion of said ground rock with the said excess quantity of phosphoric acid to form substantially dry, coalesced particulate triple superphosphate.

4. A process of manufacturing particulate triple superphosphate which comprises: dividing a predetermined quantity of ground phosphate rock into a major and a minor portion; mixing said major portion and the entire amount of phosphoric acid of the order of more than 50° Baumé necessary to form triple superphosphate from said predetermined quantity of ground phosphate rock thereby producing an over-acidulated moist essentially solid mass which can be readily handled and is disintegrable in the manner of ordinary superphosphate; disintegrating said mass into particles; and further processing the resulting particles without the addition of external heat under conditions avoiding any substantial evaporation of moisture and so as to obtain a dry final product, said further processing including adding to the outside surfaces of the disintegrated particles while still moist and over-acidulated the said minor portion of said predetermined quantity of the phosphate rock thereby causing adherence of said added rock to said moist outside surfaces and its chemical bond thereto, the concentration of the acid being such as to supply not more than the amount of water required in the entire acidulation reaction while furnishing the water evaporated by the natural heat of reaction and the amount required to furnish substantially the full amount of water of crystallization for the completely hydrated yet dry final product.

5. A process of manufacturing superphosphate which comprises grinding phosphate rock into relatively coarse and fine particles, mixing the coarse particles and the entire amount of phosphoric acid necessary to form triple superphosphate from all of said phosphate rock thereby producing an over-acidulated liquid-containing plastic mass which can be readily handled, the concentration of the acid being such that no more water is present than that required in the acidulation reaction with all of the phosphate rock employed to produce superphosphate and to furnish substantially all of the water evaporated by the natural heat of reaction and all of the water of crystallization required by complete hydration of the end product, and thereafter mixing with said mass said fine particles of the phosphate rock thereby utilizing all of the acidic component of said mass, thereby combining the remaining free acid and the last added phosphate rock as superphosphate and converting the entire mass to a dry and non-coalescent condition.

6. A process of manufacturing superphosphate which comprises grinding phosphate rock so that substantially sixty percent thereof is relatively fine and the remainder relatively coarse, mixing the coarse particles and the entire amount of phosphoric acid necessary to form triple superphosphate from all of said phosphate rock thereby producing an over-acidulated liquid-containing plastic mass which can be readily handled, the concentration of the acid being such that no more water is present than that required in the acidulation reaction with all of the phosphate rock employed to produce superphosphate and to furnish substantially all of the water evaporated by the natural heat of reaction and all of the water of crystallization required by complete hydration of the end product, and thereafter mixing with said mass said fine particles of the phosphate rock thereby utilizing all of the acidic component of said mass, thereby combining the remaining free acid and the last added phosphate rock as superphosphate and converting the entire mass to a dry and non-coalescent condition.

7. A process of manufacturing particulate triple superphosphate which comprises dividing a predetermined quantity of ground phosphate rock into a major and a minor portion, mixing said major portion and the entire amount of phosphoric acid of the order of more than 50° Baumé necessary to form triple superphosphate from said predetermined quantity of ground phosphate rock thereby producing an over-acidulated moist essentially solid mass which can be readily handled and is disintegrable in the manner of ordinary superphosphate, disintegrating said mass into particles, and further processing the resulting particles without the addition of external heat under conditions avoiding any substantial evaporation of moisture and so as to obtain a dry final product, said further processing including adding to the outside surfaces of the disintegrated particles while still moist and over-acidulated the said minor portion of said predetermined quantity of the phosphate rock thereby causing adherence of said added rock to said moist outside surfaces and its chemical bond thereto, the concentration of the acid being between about 70% and about 87% acid and being such as to supply not more than the amount of water required in the entire acidulation reaction while furnishing the water evaporated by the natural heat of reaction and the amount required to furnish substantially the full amount of water of crystallization for the completely hydrated yet dry final product.

8. A process of manufacturing pelleted superphosphate which comprises dividing ground phosphate rock into a major and a minor fraction, mixing said major fraction and the entire amount of phosphoric acid necessary to form triple superphosphate from all of said phosphate rock, placing said over-acidulated mixture in a den and leaving it there until it hardens into a plastic mass, disintegrating said mass, and while it is still hot and steaming passing it to a pelleting drum and pelleting it with the addition of said minor fraction of said rock thereby utilizing all of the acidic component of said mass and causing the pellets to pass from a palpably moist to a palpably dry state by the chemical reaction between the then unused acid and the freshly added rock by which almost all of the free moisture present at the beginning of the pelleting operation becomes water of crystallization thereby assuring the integrity of the pellets thereafter.

9. A process of manufacturing a pelleted superphosphate which comprises dividing ground phosphate rock into a major and a minor fraction, mixing said major fraction and the entire amount of phosphoric acid necessary to form triple superphosphate from all of said phosphate rock, disintegrating said mixture after it has hardened into a plastic mass, and pelleting it while it is still hot and steaming with the addition of said minor fraction of said rock thereby utilizing all of the acidic component of said mass and causing the pellets to pass from a palpably moist to a palpably dry state by the chemical reaction between the then unused acid and the freshly added rock by which almost all of the free moisture present at the beginning of the pelleting operation becomes water of crystallization thereby assuring the integrity of the pellets thereafter.

10. A process of manufacturing pelleted triple superphosphate which comprises dividing ground phosphate rock into a major portion and a minor portion, said major portion being sufficient in amount so that when it has been mixed with the entire amount of phosphoric acid necessary to form triple superphosphate from all of said phosphate rock it will produce an over-acidulated liquid-containing plastic mass which can be readily handled, the concentration of the acid being such that no more water is present than that required in the acidulation reaction with all of the phosphate rock employed to produce superphosphate and to furnish substantially all of the water evaporated by the natural heat of reaction and all of the water of crystallization required by complete hydration of the end product, mixing said major portion and all of said acid, mixing said mass so formed and said minor portion of the phosphate rock, and revolving said mass upon itself to form pellets, said second portion of said rock being sufficient in amount so that the pellets are coated and remaining free acid combined as superphosphates and the pellets converted to a dry and non-coalescent condition.

11. A process of manufacturing a pelleted superphosphate which comprises dividing ground phosphate rock into a major fraction and a minor fraction, mixing said major fraction with the entire amount of phosphoric acid necessary to form superphosphate from all of said rock, and further processing the resulting mass without the addition of heat under conditions avoiding any substantial evaporation and so as to obtain a dry final product, the concentration of the acid being such as to supply not more than the amount of water required in the acidulation reaction of all of said phosphate rock and evaporated by the natural heat of reaction and the amount required to furnish substantially the full amount of water of crystallization for the completely hydrated final product, said further processing including conveying said mixture to a rotatable drum, said conveying operation being of a length sufficient so that the said over-acidulated mass becomes plastic during it, placing said plastic mass and said minor fraction of said phosphate rock in said drum and revolving said drum to form pellets thereby utilizing all of the acidic component of said mass, the pellets being dried by the chemical reaction between the then unused acid and the freshly added rock.

12. A process of manufacturing superphosphate which comprises dividing ground phosphate rock into a major and a minor fraction, mixing said major fraction and the entire amount of phosphoric acid necessary to form triple superphosphate from all of said phosphate rock, pouring successive mixtures so formed into successive layers in a form thereby creating a block of over-acidulated superphosphate, removing the form, scraping material from the top of the block and conveying it to a pelleting drum, such scraping and conveying operation being effective to place in said drum disintegrated plastic material, and mixing said material and said minor fraction of said phosphate rock.

13. A process of manufacturing triple superphosphate which comprises dividing ground phosphate rock into a major and a minor fraction, placing in a container said major fraction and the entire amount of phosphoric acid necessary to form triple superphosphate from all of said phosphate rock, introducing paddles into said container thereby mixing the mass, after such mixing has been completed removing said paddles and leaving the mixture untreated until it has become plastic, re-introducing said paddles into said container and revolving them in order to form pellets, introducing into said container said minor fraction of said phosphate rock and continuing such agitation so that the pellets are coated whereby they are dried by chemical reaction between the freshly added rock and the then unused acid.

14. A process of manufacturing a pelleted superphosphate of relatively high phosphatic content which comprises separating ground phosphate rock into a first portion and a second portion, said first portion including relatively coarse rock particles and said second portion consisting only of relatively fine rock particles, mixing said first portion with an acid solution which contains an acid of phosphorus in an amount sufficient to acidulate said entire amount of said rock, the concentration of the acid being such that no more water is present than that required in the acidulation reaction with all of the phosphate rock employed to produce superphosphate and to furnish substantially all of the water evaporated by the natural heat of reaction and all of the water of crystallization required by complete hydration of the end product, said first portion of said rock being sufficient in amount so that when all of said acid is added thereto it reduces said rock to a material which considered in its totality has the characteristics of moist sand, adding said acid to said first portion, agitating the mass so formed to produce pellets and adding said second portion of said rock to said last mentioned mass during a later portion of said agitation, said second portion of said rock being sufficient in amount so that the pellets are coated and remaining free acid combined as superphosphate and the pellets converted to a dry non-coalescent condition.

15. A process of manufacturing a pelleted superphosphate of relatively high phosphatic content which comprises separating ground phosphate rock into a first portion and a second portion, said first portion including relatively coarse rock particles and a second portion consisting only of relatively fine rock particles, the ratio of said first portion to said second portion being of the order of seven to one, mixing said first portion with an acid solution which contains an acid of phosphorus in an amount sufficient to acidulate said entire amount of said rock, the concentration of the acid being such that no more water is present than that required in the acidulation reaction with all of the phosphate rock employed to produce superphosphate and to furnish substantially all of the water evaporated by the natural heat of reaction and all of the water of crystallization required by complete hydration of the end product, said first portion of said rock being sufficient in amount so that when all of said acid is added thereto it reduces said rock to a material which considered in its totality has the characteristics of moist sand, adding said acid to said first portion, agitating the mass so formed to produce pellets and adding said second portion of said rock to said last mentioned mass during a later portion of said agitation said second portion of said rock being sufficient in amount so that the pellets are coated and remaining free acid combined as superphosphate and the pellets converted to a dry and non-coalescent condition.

16. A process of manufacturing a pelleted mixed superphosphatic fertilizer which comprises dividing ground phosphate rock into a major and minor fraction, mixing said major fraction and the entire amount of phosphoric acid necessary to form triple superphosphate from all of said phosphate rock, placing said over-acidulated mixture in a den and leaving it there until it hardens into a plastic mass, disintegrating said mass, thereupon adding another fertilizer material to said mass, and while the mixture so formed is still hot and steaming from said original mixture of phosphate rock and phosphoric acid passing the combined mixture to a pelleting drum and pelleting it with the addition of said minor fraction of said rock thereby utilizing all of the acidic component of said mass and causing the pellets to pass from a palpably moist to a palpably dry state by the chemical reaction between the then unused acid and the freshly added rock by which almost all of the free moisture present at the beginning of the pelleting operation becomes water of crystallization thereby assuring the integrity of the pellets thereafter.

17. A process of manufacturing a complete pelleted mixed superphosphatic fertilizer which comprises dividing ground phosphate rock into a major and minor fraction, mixing said major fraction and the entire amount of phosphoric acid necessary to form triple superphosphate from all of said phosphate rock, disintegrating said mixture after it has hardened into a plastic mass, and thereupon adding nitrogen-bearing and potash-bearing fertilizer materials and pelleting the resulting mixture while it is still hot and steaming from the original mixture of acid and rock with the addition of said minor fraction of said rock late in the pelleting operation, thereby utilizing all of the acidic component of said mass and causing the pellets to pass from a palpably moist to a palpably dry state by the chemical reaction between the then unused acid and the freshly added rock by which almost all of the free moisture present at the beginning of the pelleting operation becomes water of crystallization thereby assuring the integrity of the pellets thereafter.

References Cited in the file of this patent

UNITED STATES PATENTS

| Number | Name | Date |
|---|---|---|
| 389,566 | Glaser | Sept. 18, 1888 |
| 1,146,222 | Wilson et al. | July 13, 1915 |
| 1,916,114 | Ober et al. | June 27, 1933 |
| 2,061,567 | Facer | Nov. 24, 1936 |
| 2,106,223 | Nordengren | Jan. 25, 1938 |
| 2,136,793 | Gabeler et al. | Nov. 15, 1938 |